United States Patent
Onishi et al.

(10) Patent No.: US 11,925,909 B2
(45) Date of Patent: Mar. 12, 2024

(54) SLURRY MANUFACTURING APPARATUS AND METHOD FOR MANUFACTURING SLURRY

(71) Applicant: NIHON SPINDLE MANUFACTURING CO., LTD., Hyogo (JP)

(72) Inventors: Keiichiro Onishi, Hyogo (JP); Keiichi Asami, Hyogo (JP)

(73) Assignee: NIHON SPINDLE MANUFACTURING CO., LTD., Hyogo (JP)

( * ) Notice: Subject to any disclaimer, the term of this patent is extended or adjusted under 35 U.S.C. 154(b) by 711 days.

(21) Appl. No.: 17/109,662

(22) Filed: Dec. 2, 2020

(65) Prior Publication Data

US 2021/0086145 A1    Mar. 25, 2021

Related U.S. Application Data

(63) Continuation of application No. PCT/JP2019/024373, filed on Jun. 19, 2019.

(30) Foreign Application Priority Data

Jul. 5, 2018 (JP) .................................. 2018-128590

(51) Int. Cl.
*B01F 3/04* (2006.01)
*B01F 23/20* (2022.01)
(Continued)

(52) U.S. Cl.
CPC .......... *B01F 23/29* (2022.01); *B01F 23/2366* (2022.01); *B01F 23/53* (2022.01); *B01F 23/59* (2022.01); *B01F 23/565* (2022.01)

(58) Field of Classification Search
CPC ...... B01F 23/2366; B01F 23/29; B01F 23/53; B01F 23/565; B01F 23/59
(Continued)

(56) References Cited

U.S. PATENT DOCUMENTS 4,211,733 A     7/1980 Chang
4,466,928 A *   8/1984 Kos ................... B01F 23/23231
                                              261/DIG. 27
(Continued)

FOREIGN PATENT DOCUMENTS

JP      2003-326281 A    11/2003
JP      2014-140814 A     8/2014
(Continued)

OTHER PUBLICATIONS

Search Report issued in European Application No. 19830859.5, dated Jul. 7, 2021.
(Continued)

*Primary Examiner* — Charles S Bushey
(74) *Attorney, Agent, or Firm* — Michael Best & Friedrich LLP

(57) ABSTRACT

Provided is a slurry manufacturing apparatus including: a mixing unit that mixes a predetermined powder and a solvent in a mixing chamber to produce a slurry; a supply unit that supplies a reaction gas to the mixing chamber when the slurry is produced by the mixing unit; and a circulation unit that recovers a surplus of the reaction gas from the mixing chamber and resupplies the surplus of the reaction gas to the mixing chamber.

16 Claims, 9 Drawing Sheets

(51) Int. Cl.
*B01F 23/23* (2022.01)
*B01F 23/50* (2022.01)
*B01F 23/53* (2022.01)

(58) Field of Classification Search
USPC .................................................. 261/DIG. 27
See application file for complete search history.

(56) References Cited

U.S. PATENT DOCUMENTS

| | | | | |
|---|---|---|---|---|
| 4,483,826 | A * | 11/1984 | Louthan | C07C 319/24 261/36.1 |
| 5,227,136 | A | 7/1993 | Hanify et al. | |
| 5,711,852 | A | 1/1998 | Ekholm et al. | |
| 5,762,687 | A * | 6/1998 | Grossmann | B01F 25/53 96/216 |
| 6,328,801 | B1 * | 12/2001 | Gary | B01D 53/04 261/DIG. 27 |
| 9,698,419 | B1 * | 7/2017 | Frianeza-Kullberg | H01M 4/5825 |
| 11,251,418 | B2 * | 2/2022 | Sakamoto | C01G 53/50 |
| 2010/0317748 | A1 * | 12/2010 | Hassan | C10G 2/344 518/700 |
| 2011/0183211 | A1 * | 7/2011 | Uchida | H01M 4/0404 29/623.5 |
| 2014/0241108 | A1 * | 8/2014 | Stoppler | B01F 27/2123 366/137 |
| 2018/0183047 | A1 | 6/2018 | Sakamoto et al. | |

FOREIGN PATENT DOCUMENTS

| | | |
|---|---|---|
| JP | 2014-226612 A | 12/2014 |
| JP | 6245625 B1 | 12/2017 |
| JP | 2018-130646 A | 8/2018 |
| WO | WO-2017/138192 A1 | 8/2017 |

OTHER PUBLICATIONS

International Search Report issued in Application No. PCT/JP2019/024373, dated Sep. 17, 2019.

* cited by examiner

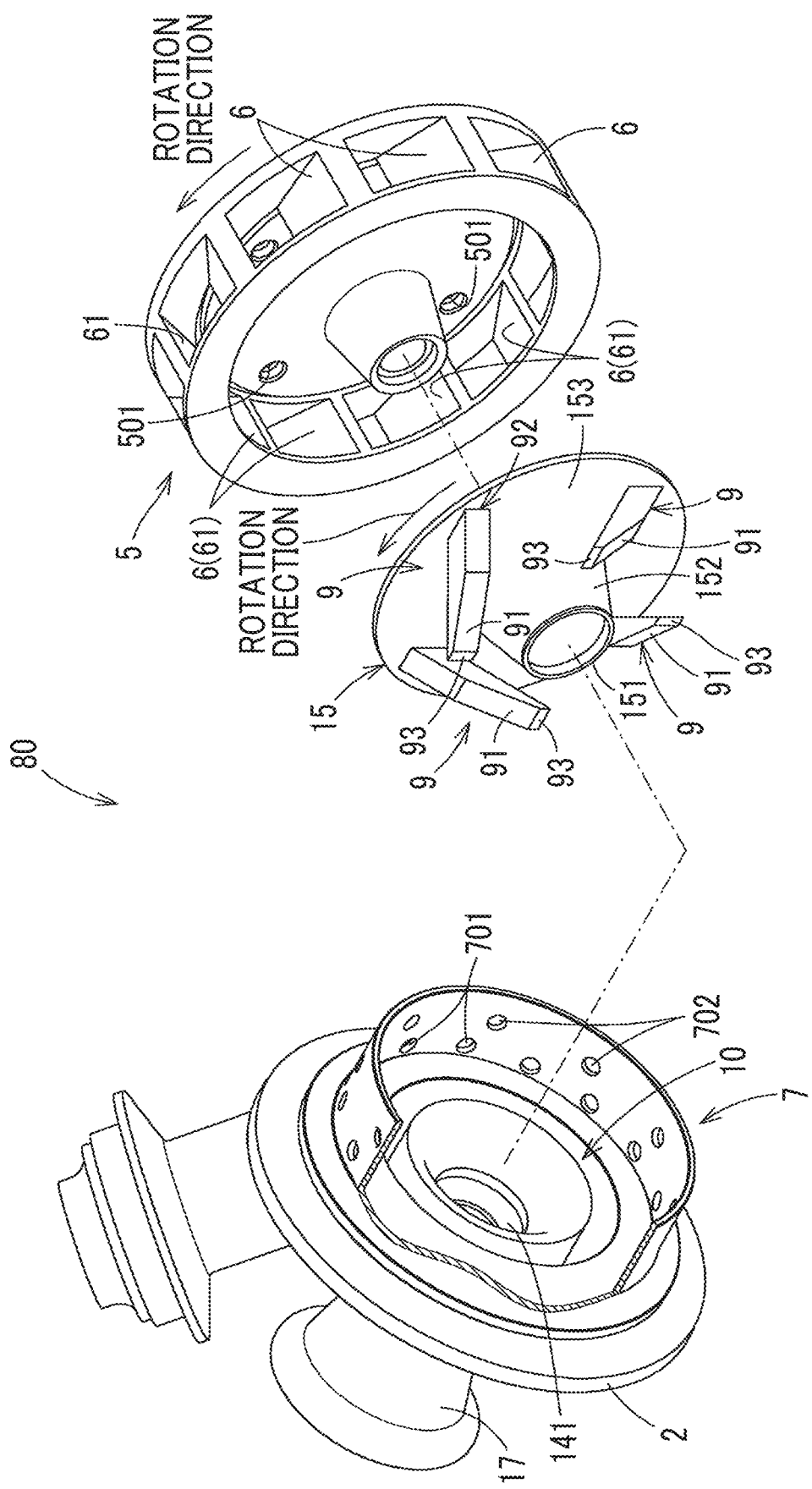

SLURRY MANUFACTURING APPARATUS AND METHOD FOR MANUFACTURING SLURRY

RELATED APPLICATIONS

The contents of Japanese Patent Application No. 2018-128590, and of International Patent Application No. PCT/JP2019/024373, on the basis of each of which priority benefits are claimed in an accompanying application data sheet, are in their entirety incorporated herein by reference.

BACKGROUND

Technical Field

Certain embodiments of the present invention relate to a slurry manufacturing apparatus and a method for manufacturing a slurry.

Description of Related Art

Hitherto, a slurry manufacturing apparatus for producing a slurry by mixing a powder and a solvent has been known. For example, the related art discloses a slurry manufacturing apparatus for producing a slurry for a positive electrode of a non-aqueous electrolyte secondary battery by mixing a powder (an active material that occludes and releases alkali metal ions, a carbon-based conductivity aid, and an aqueous binder) and a solvent (water).

In the slurry manufacturing apparatus disclosed in the related art, carbon dioxide gas is supplied into the apparatus, and the carbon dioxide gas is dissolved in the slurry for the positive electrode produced in the apparatus. Accordingly, an alkaline component in the slurry is neutralized. As the alkaline component in the slurry is neutralized, corrosion of the aluminum current collector is prevented.

SUMMARY

According to an embodiment of the present invention, there is provided a slurry manufacturing apparatus including a mixing unit that mixes a predetermined powder and a solvent in a mixing chamber to produce a slurry; a supply unit that supplies a reaction gas to the mixing chamber when the slurry is produced by the mixing unit; and a circulation unit that recovers a surplus of the reaction gas from the mixing chamber and resupplies the reaction gas to the mixing chamber.

BRIEF DESCRIPTION OF THE DRAWINGS

FIG. 5 is an exploded perspective view illustrating the internal structure of the dispersion mixing pump.

DETAILED DESCRIPTION

In lithium composite oxides contained in the slurry for the positive electrode, lithium hydroxide added during the synthesis remains. Lithium hydroxide comes into contact with water and increases the pH value of the slurry. There is concern that the slurry that is strongly alkaline and has a pH value of more than 11 may corrode an aluminum current collector during coating.

The slurry manufacturing apparatus disclosed in the related art emits a surplus of carbon dioxide gas supplied into the apparatus from an air emission pipe to the outside. However, there is concern that the emission of carbon dioxide gas may increase the environmental load on the surrounding environment.

In addition, of the carbon dioxide gas supplied into the apparatus, the carbon dioxide gas emitted to the outside does not contribute to the neutralization of the alkaline component in the slurry. Therefore, it is required to reduce the amount of carbon dioxide gas that does not contribute to the neutralization of the alkaline component in the slurry and reduce the amount of carbon dioxide gas supplied into the apparatus.

It is desirable to provide a slurry manufacturing apparatus capable of reducing the amount of reaction gas emitted from the apparatus and reducing the amount of reaction gas supplied into the apparatus.

According to the above configuration, the surplus of the reaction gas supplied to the mixing chamber by the supply unit is recovered by the circulation unit and resupplied to the mixing chamber. Accordingly, at least a portion of the reaction gas to be supplied to the mixing chamber by the supply unit can be replaced by the reaction gas resupplied from the circulation unit. As a result, the amount of the reaction gas supplied to the mixing chamber by the supply unit can be reduced. Accordingly, the amount of the reaction gas emitted to the outside can be reduced, so that the environmental load can be reduced.

First Embodiment

Overall Configuration of Slurry Manufacturing Apparatus 100

Hereinafter, a slurry manufacturing apparatus 100 according to a first embodiment of the present invention will be described. Embodiments described below are merely an example of the present invention, and it is needless to say that the embodiments of the present invention can be appropriately changed without changing the concept of the present invention.

Figure 1:
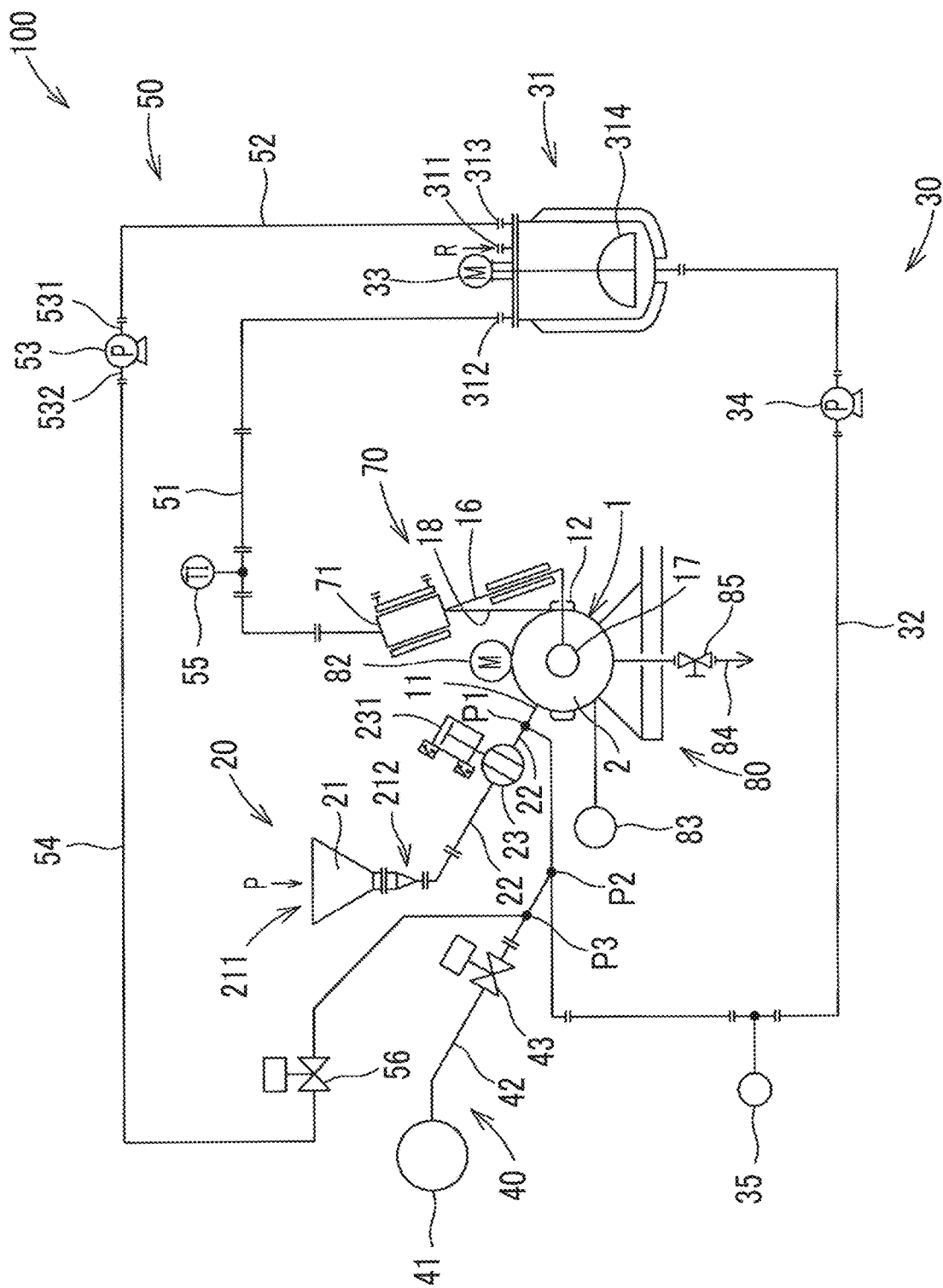
FIG. 1 is an explanatory view illustrating an outline of a slurry manufacturing apparatus according to a first embodiment.
Figure 2:
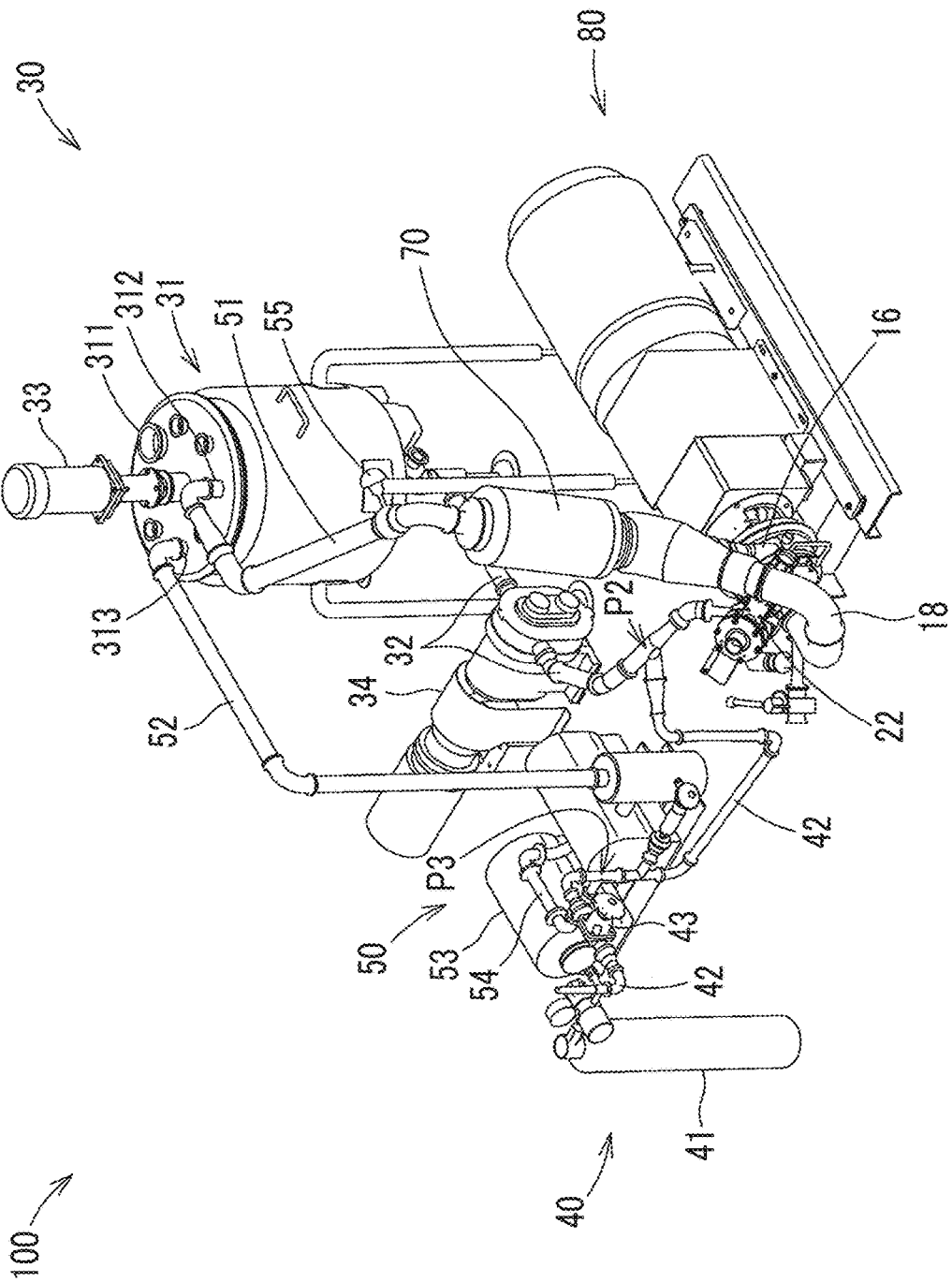
FIG. 2 is an external perspective view of the slurry manufacturing apparatus according to the first embodiment.

A slurry manufacturing apparatus 100 illustrated in FIGS. 1 and 2 includes a dispersion mixing pump 80, a powder supply unit 20, a solvent supply unit 30, a gas supply unit 40, and a circulation unit 50. In FIG. 2, the powder supply unit 20 is omitted. The dispersion mixing pump 80 is an example of a mixing unit. The gas supply unit 40 is an example of a supply unit.

Figure 3:
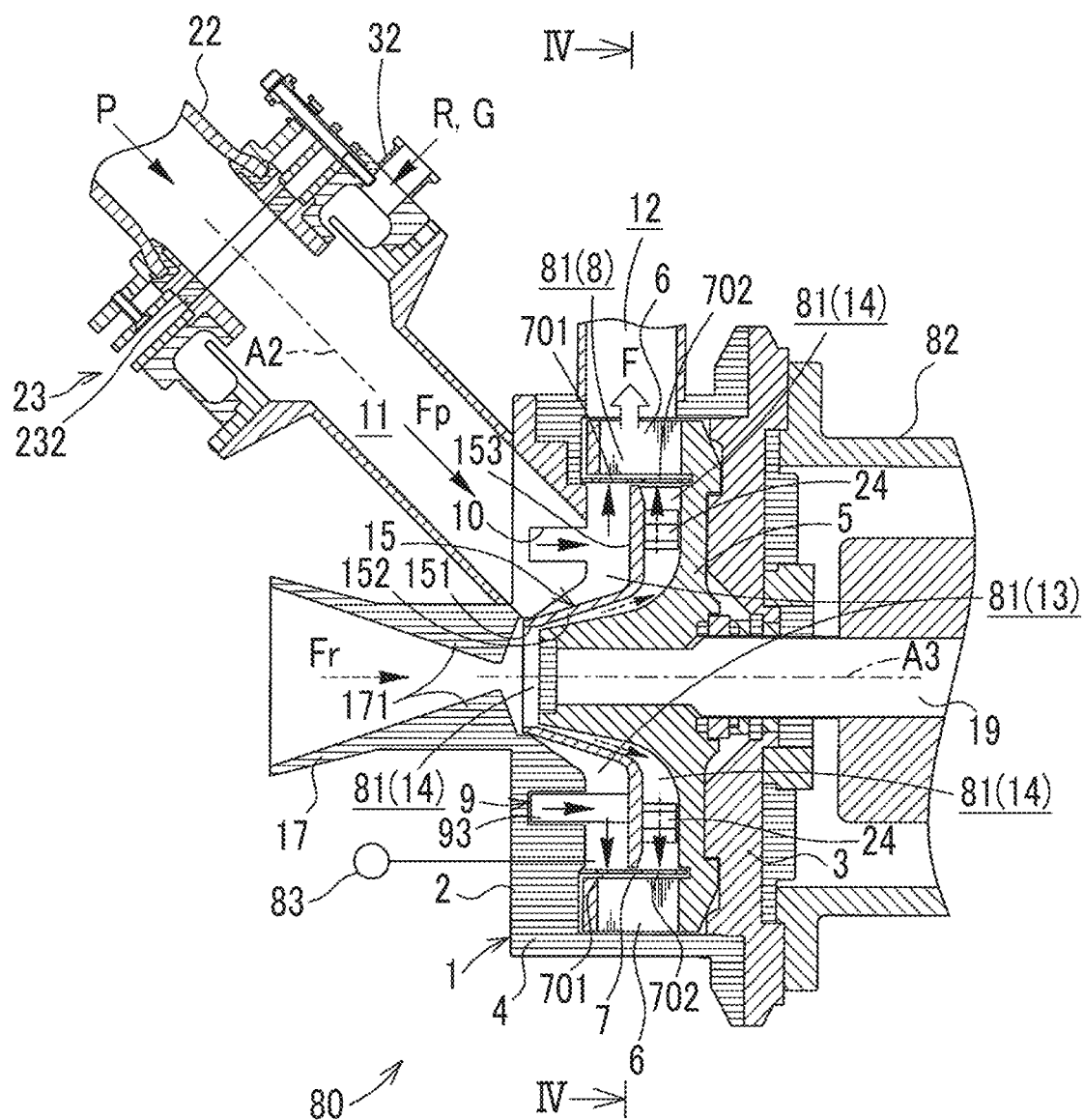
FIG. 3 is an explanatory view illustrating an internal structure of a dispersion mixing pump.

As illustrated in FIG. 3, the dispersion mixing pump 80 has a mixing chamber 81. The dispersion mixing pump 80 illustrated in FIGS. 1 and 2 mixes a powder P and a solvent R in the mixing chamber 81 and produces a slurry F with a reaction gas G supplied. The powder supply unit 20 illustrated in FIG. 1 supplies the powder P to the mixing chamber 81. The solvent supply unit 30 illustrated in FIGS. 1 and 2 supplies the solvent R to the mixing chamber 81. The gas supply unit 40 illustrated in FIGS. 1 and 2 supplies the reaction gas G to the mixing chamber 81. The circulation unit 50 illustrated in FIGS. 1 and 2 recovers the reaction gas G from the mixing chamber 81 and resupplies the recovered reaction gas G to the mixing chamber 81.

The slurry manufacturing apparatus 100 in the present embodiment is an apparatus for manufacturing a slurry for a positive electrode of a non-aqueous electrolyte secondary battery using an aqueous solvent containing an alkali metal composite oxide. The powder P is a slurry material used for manufacturing an electrode for the non-aqueous electrolyte secondary battery, and is an active material that occludes and releases alkali metal ions, a carbon-based conductivity aid, and an aqueous binder. The solvent R is water, and the reaction gas G is carbon dioxide gas.

Powder Supply Unit 20

As illustrated in FIG. 1, the powder supply unit 20 includes a hopper 21, a powder supply pipe 22, and a valve 23.

The hopper 21 is formed in an inverted conical shape which is decreased in diameter from the upper portion toward the lower portion, and is disposed in a posture with a center axis along a vertical direction. The hopper 21 discharges the powder P received from an upper opening portion 211 from a lower opening portion 212. The lower opening portion 212 of the hopper 21 is connected to the powder supply pipe 22.

The powder supply pipe 22 is a cylindrical pipe disposed in a state in which a center axis is inclined with respect to the vertical direction. The upper portion of the powder supply pipe 22 is connected to the lower opening portion 212 of the hopper 21. The lower portion of the powder supply pipe 22 is connected to the dispersion mixing pump 80 (specifically, a first supply unit 11 of the dispersion mixing pump 80). A position where the powder supply pipe 22 and the first supply unit 11 are connected is a connection position P1.

As illustrated in FIGS. 1 and 3, the valve 23 opens and closes the powder supply pipe 22 by a shutter 232 (see FIG. 3) moved by an air cylinder 231 (see FIG. 1). Means for moving the shutter 232 does not have to be the air cylinder 231 and may be, for example, a hydraulic cylinder or a motor. In a state where the valve 23 is opened, the hopper 21 and the first supply unit 11 communicate with each other via the powder supply pipe 22. That is, the powder P can move from the hopper 21 to the first supply unit 11 through the powder supply pipe 22. In a state where the valve 23 is closed, the communication between the hopper 21 and the first supply unit 11 is blocked by the shutter 232. At this time, the powder P cannot move from the hopper 21 to the first supply unit 11.

Solvent Supply Unit 30

As illustrated in FIG. 1, the solvent supply unit 30 includes a storage tank (an example of a storage unit) 31 and a slurry resupply pipe 32.

The solvent R and the slurry F are stored in the storage tank 31. The solvent R is supplied to the storage tank 31 via a solvent supply port 311. The slurry F is recovered from the dispersion mixing pump 80 via a recovery pipe 51 of the circulation unit 50 and a recovery port 312.

The storage tank 31 includes a gas port 313 and a stirring mechanism 314. The gas port 313 is connected to an intake pipe 52 of the circulation unit 50. The reaction gas G inside the storage tank 31 can move to the intake pipe 52 via the gas port 313. The stirring mechanism 314 is disposed inside the storage tank 31. The stirring mechanism 314 is driven by a motor 33 to stir the solvent R and the slurry F inside the storage tank 31.

The slurry resupply pipe 32 connects the storage tank 31, the powder supply pipe 22, and the first supply unit 11. One end of the slurry resupply pipe 32 is connected to the storage tank 31. The other end of the slurry resupply pipe 32 is connected to the powder supply pipe 22 and the first supply unit 11 at the connection position P1.

The slurry resupply pipe 32 is provided with a pump 34 and a flow rate sensor 35. The pump 34 suctions the solvent R and the slurry F stored in the storage tank 31 and delivers the solvent R and the slurry F toward the other end of the slurry resupply pipe 32, that is, toward the first supply unit 11. The flow rate sensor 35 outputs a signal corresponding to the flow rates of the solvent R and the slurry F flowing through the slurry resupply pipe 32 to a control unit (not illustrated).

The control unit controls operations of the slurry manufacturing apparatus 100. The control unit may be realized by a central processing unit (CPU) that executes a program stored in the memory, may be realized by a hardware circuit, or may be a combination thereof.

Gas Supply Unit 40

As illustrated in FIGS. 1 and 2, the gas supply unit 40 includes a cylinder 41, a gas supply pipe 42, and a valve 43.

The cylinder 41 stores the reaction gas G.

As illustrated in FIG. 2, the gas supply pipe 42 is a cylindrical pipe. One end of the gas supply pipe 42 is connected to the upper end portion of the cylinder 41. As illustrated in FIG. 1, the other end of the gas supply pipe 42 is connected to the slurry resupply pipe 32 at a connection position P2. The connection position P2 is a position between the flow rate sensor 35 and the connection position P1 in the slurry resupply pipe 32.

The valve 43 illustrated in FIGS. 1 and 2 opens and closes the gas supply pipe 42. In a state where the valve 43 is opened, the cylinder 41 and the dispersion mixing pump 80 communicate with each other via the gas supply pipe 42, the connection position P2, the slurry resupply pipe 32, the connection position P1, and the powder supply pipe 22. At this time, the reaction gas G can move to the first supply unit 11 through the gas supply pipe 42 and the slurry resupply pipe 32 between the connection position P2 and the connection position P1. In a state where the valve 43 is closed, the communication between the cylinder 41 and the first supply unit 11 is blocked by the valve 43. At this time, the reaction gas G cannot move from the cylinder 41 to the first supply unit 11.

Dispersion Mixing Pump 80

As illustrated in FIGS. 1 and 3, the dispersion mixing pump 80 includes a casing 1, the first supply unit 11, a discharge unit 12, a second supply unit 17, a mixing rotor 5, a pump drive motor 82, a partition plate 15, a stator 7, a pressure sensor 83, and a discharge pipe 84.

As illustrated in FIG. 3, the casing 1 includes a cylindrical outer peripheral wall portion 4 having openings at both ends closed by a front wall portion 2 and a rear wall portion 3. The casing 1 has the mixing chamber 81 therein, which is divided by the front wall portion 2, the rear wall portion 3, and the outer peripheral wall portion 4. The mixing chamber 81 is divided into a blade chamber 8 and an introduction chamber by the stator 7. The introduction chamber is divided into a first introduction chamber 13 and a second introduction chamber 14 by the partition plate 15. That is, the mixing chamber 81 is constituted of the blade chamber 8, the first introduction chamber 13, and the second introduction chamber 14.

The first supply unit 11 is provided at a position shifted to the outer peripheral side of the center axis (axial center A3 of the casing 1) of the front wall portion 2. In the present embodiment, the downward inclination angle of the first supply unit 11 with respect to a horizontal direction (left-right direction in FIG. 3) is about 45 degrees. The first supply unit 11 has a substantially cylindrical shape.

One end of the first supply unit 11 communicates with the first introduction chamber 13. As illustrated in FIG. 1, the other end of the first supply unit 11 communicates with the connection position P1. As illustrated in FIG. 3, one end portion of the first supply unit 11 (an opening portion of the first supply unit 11 that opens into the casing 1) has a part of an annular groove 10 formed in the front wall portion 2 therein. The powder P supplied by the powder supply unit 20, the solvent R supplied by the solvent supply unit 30, and the reaction gas G supplied by the gas supply unit 40 are introduced to the first introduction chamber 13 via the first supply unit 11.

The discharge unit 12 discharges the slurry F produced by mixing the powder P and the solvent R in the mixing chamber 81. The discharge unit 12 has a substantially cylindrical shape. The discharge unit 12 is provided at one location in the circumferential direction of the outer peripheral wall portion 4 and communicates with the blade chamber 8.

Figure 4:
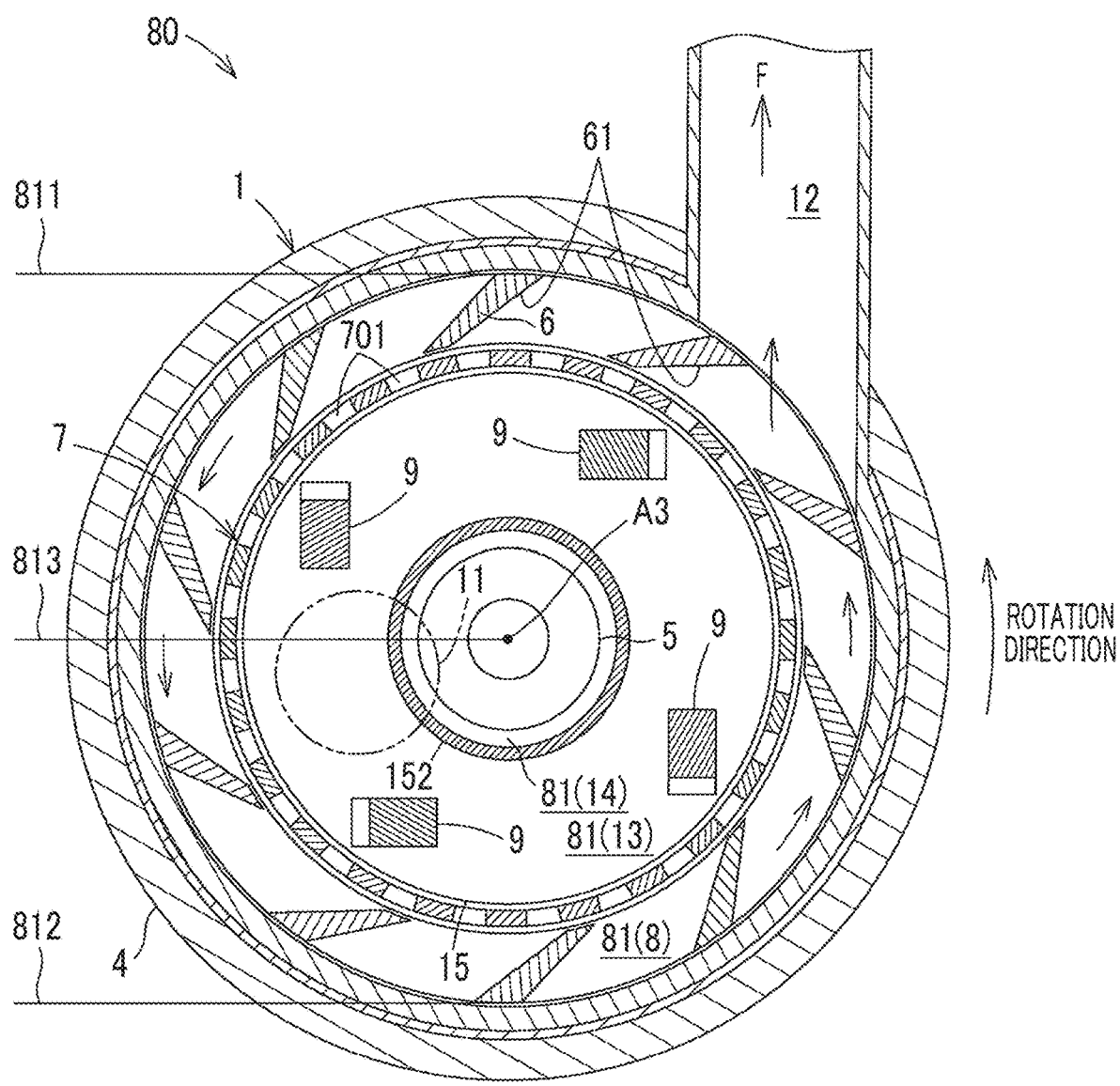
FIG. 4 is a cross-sectional view of FIG. 3 when viewed in an IV-IV direction.

As illustrated in FIG. 4, the discharge unit 12 extends in the tangential direction of the outer peripheral wall portion 4. In other words, the discharge unit 12 and a discharge pipe 18 extend from the mixing chamber 81 in a direction perpendicular to the axial center A3. Accordingly, the rotation of the mixing rotor 5 can generate a gas flow from the mixing chamber 81 toward the discharge unit 12 and the discharge pipe 18. Along this flow, the reaction gas G in the mixing chamber 81 can be easily sent to the discharge unit 12 and the discharge pipe 18.

The discharge unit 12 and the discharge pipe 18 do not necessarily have to be perpendicular to the axial center A3. As long as the discharge unit 12 and the discharge pipe 18 extend in a direction in which the gas is introduced into the discharge unit 12 and the discharge pipe 18 along the gas flow formed by the rotation of the mixing rotor 5, an effect of easily sending the reaction gas G in the mixing chamber 81 can be obtained. That is, the rotation direction of the mixing rotor 5 in the vicinity of the discharge unit 12 and the discharge pipe 18 and the extension direction of the discharge unit 12 and the discharge pipe 18 may be substantially the same direction.

In addition, the discharge unit 12 extends from the upper portion side of the mixing chamber 81. The upper portion side of the mixing chamber 81 is, in the mixing chamber 81, a position above a height 813 which is the midpoint between an upper end 811 and a lower end 812 of the mixing chamber 81, that is, above the height 813 the same as the axial center A3. In the mixing chamber 81, the reaction gas G, which is a gas, tends to be located above the slurry F, which is a solid or a liquid. Therefore, with the discharge unit 12 extending from the upper portion side of the mixing chamber 81, the reaction gas G can be easily sent to the discharge pipe 18.

As illustrated in FIG. 3, the second supply unit 17 protrudes from the center portion of the front wall portion 2. One end of the second supply unit 17 is connected to the front wall portion 2 and communicates with the second introduction chamber 14. As illustrated in FIG. 1, the other end of the second supply unit 17 is connected to a circulation flow path 16 of a recirculation mechanism unit 70. The second supply unit 17 has a cylindrical shape. As illustrated in FIG. 3, the axial center of the second supply unit 17 coincides with the axial center A3 of the casing 1. A throttle portion 171 is formed in the second supply unit 17. The inner diameter of the throttle portion 171 is smaller than the inner diameter of the circulation flow path 16, and is smaller than the inner diameter of a tubular sliding contact portion 151 of the partition plate 15. That is, the flow path area of the throttle portion 171 is smaller than the flow path area of the circulation flow path 16, and is smaller than the flow path area of the tubular sliding contact portion 151.

As illustrated in FIGS. 3 and 4, the mixing rotor 5 is rotatably provided inside the casing 1. The axial center of the mixing rotor 5 coincides with the axial center A3 of the casing 1.

The mixing rotor 5 is configured to have a shape in which the front surface bulges substantially into a truncated cone shape. A plurality of rotor blades 6 are attached to the outer peripheral side of the mixing rotor 5. The plurality of rotor blades 6 are arranged at equal intervals in a state of protruding forward from the mixing rotor 5. In FIG. 4, ten rotor blades 6 are arranged at equal intervals in the circumferential direction. The rotor blade 6 protrudes from the outer peripheral side toward the inner peripheral side of the mixing rotor 5 so as to be inclined rearward in the rotation direction from the inner peripheral side toward the outer peripheral side.

As illustrated in FIG. 3, the mixing rotor 5 is connected to a drive shaft 19 of the pump drive motor 82 inserted into the casing 1 through the rear wall portion 3. The mixing rotor 5 is driven by the pump drive motor 82 to rotate.

Since the rotor blade 6 has the above-described configuration, when the mixing rotor 5 is driven to rotate in a direction in which the tip part of the rotor blade 6 faces forward when viewed in the axial center direction (rotation direction indicated by arrows in FIGS. 4 to 6C), cavitation (local boiling) occurs according to the pressure difference between the inside and the outside of the mixing chamber 81 in the slurry F located in a space behind a rear surface 61, which is the surface on the rear side in the rotation direction of the rotor blade 6.

As illustrated in FIGS. 3 and 5, the partition plate 15 is disposed between the front wall portion 2 and the mixing rotor 5 in the mixing chamber 81. As illustrated in FIG. 3, the partition plate 15 divides the introduction chamber, which is the space on the inner peripheral side of the stator 7 in the mixing chamber 81, into the first introduction chamber 13 on the front wall portion 2 side and the second introduction chamber 14 on the mixing rotor 5 side.

As illustrated in FIGS. 3 and 5, the partition plate 15 is configured in a substantially funnel shape having an outer diameter slightly smaller than the inner diameter of the stator 7. The partition plate 15 is provided with a funnel-shaped portion 152 protruding in a cylindrical shape at the center portion thereof. The tubular sliding contact portion 151 at the top of the funnel-shaped portion 152 is open. In addition, the partition plate 15 is provided with an annular flat plate portion 153 at the outer peripheral portion of the funnel-shaped portion 152 with both the front surface and the rear surface being in a state perpendicular to the axial center A3 of the casing 1.

The partition plate 15 is attached to attachment portions 501 of the front surface of the mixing rotor 5 via spacing members 24 in a posture in which the tubular sliding contact portion 151 faces the front wall portion 2 side. As illustrated in FIG. 6C, the spacing members 24 are arranged at a plurality of (in this embodiment, four) locations at equal intervals in the circumferential direction. Stirring blades 25 are attached to the spacing members 24.

As illustrated in FIGS. 3 and 5, scraping blades 9 are provided on the surface of the partition plate 15 on the front wall portion 2 side. As illustrated in FIGS. 4 to 6C, a plurality of (in FIGS. 4 to 6C, four) scraping blades 9 are concentrically provided at equal intervals in the circumferential direction. As illustrated in FIG. 3, the scraping blades 9 are located in the first introduction chamber 13. The tip part of the scraping blade 9 is fitted into the annular groove 10.

Figure 6A:
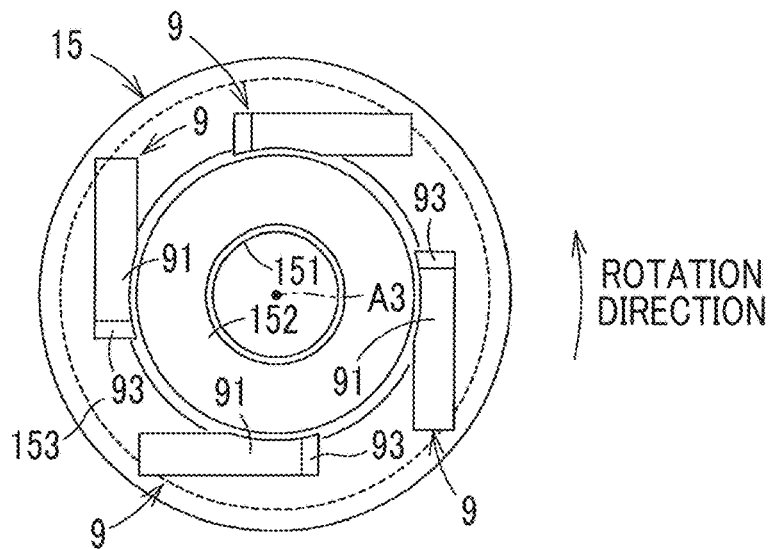
FIG. 6A, FIG. 6B, and FIG. 6C are schematic configuration views of a partition plate.
Figure 6B:
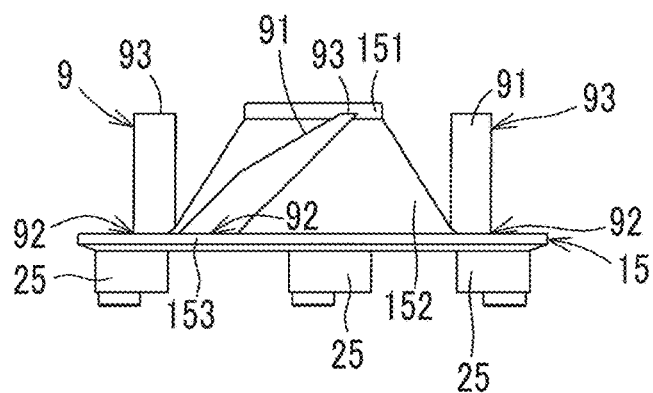
Figure 6C:
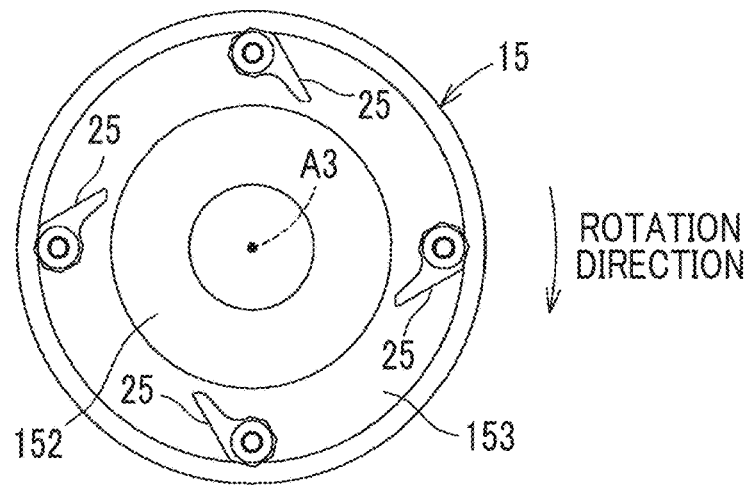

As illustrated in FIGS. 5 to 6C, the scraping blade 9 is formed in a rod shape. A base end part 92 of the scraping blade 9 is fixed to rotate integrally with the mixing rotor 5 in an inclined posture in which the scraping blade 9 is located closer to the front wall portion 2 toward the tip end side of the scraping blade 9 when viewed in a radial direction of the mixing rotor 5 (viewed in a direction into the paper of FIG. 6B) and is located closer to the radially inner side of the mixing rotor 5 toward the tip end side of the scraping blade 9 when viewed in the axial center direction of the mixing rotor 5 (viewed in a direction into the paper of FIG. 6A).

When the mixing rotor 5 rotates, the partition plate 15 rotates integrally with the mixing rotor 5. At this time, each of the scraping blades 9 revolves integrally with the mixing rotor 5 in a state where a tip part 93 thereof enters the annular groove 10 (see FIG. 3).

As illustrated in FIGS. 4 and 5, the stator 7 is a cylindrical member. As illustrated in FIG. 3, the stator 7 is disposed in the mixing chamber 81. Specifically, the stator 7 is disposed between the front wall portion 2 and the mixing rotor 5 as illustrated in FIG. 3, and is disposed to surround the mixing rotor 5 when viewed in the horizontal direction along the axial center A3 as illustrated in FIG. 4. As illustrated in FIG. 5, the stator 7 is attached to the inner surface of the front wall portion 2 (the surface facing the mixing rotor 5). As illustrated in FIG. 3, the partition plate 15 divides the mixing chamber 81 into the blade chamber 8 on the outer peripheral wall portion 4 side and the introduction chamber (the first introduction chamber 13 and the second introduction chamber 14) on the mixing rotor side.

As illustrated in FIG. 4, the blade chamber 8 is annular. The plurality of rotor blades 6 protruding from the mixing rotor 5 are located in the blade chamber 8.

As illustrated in FIGS. 3 and 5, a plurality of through-holes 701 and 702 are formed in the stator 7. A plurality of the through-holes 701 are arranged at equal intervals in the circumferential direction at a portion of the stator 7 facing the first introduction chamber 13. A plurality of the through-holes 702 are arranged at equal intervals in the circumferential direction at a portion of the stator 7 facing the second introduction chamber 14. Therefore, as illustrated in FIG. 3, the blade chamber 8 communicates with the first introduction chamber 13 through the through-holes 701 and communicates with the second introduction chamber 14 through the through-holes 702.

As illustrated in FIGS. 1 and 3, the pressure sensor 83 is attached to the front wall portion 2. The pressure sensor 83 outputs a signal corresponding to the pressure inside the first introduction chamber 13 to the control unit.

As illustrated in FIG. 1, the discharge pipe 84 is connected to the lower portion of the mixing chamber 81 via a valve 85. The discharge pipe 84 is connected to a slurry outlet. The valve 85 is opened when the produced slurry F is taken out. The position where the discharge pipe 84 is connected is not limited to the mixing chamber 81, and for example, the discharge pipe 84 may be connected to the slurry resupply pipe 32.

Recirculation Mechanism Unit 70

The recirculation mechanism unit 70 illustrated in FIG. 1 separates the dissolved liquid in a cylindrical container 71 by specific gravity. Specifically, the recirculation mechanism unit 70 may separate, in the slurry F supplied from the discharge unit 12 of the dispersion mixing pump 80 via the discharge pipe 18, an undispersed slurry Fr in a state in which the powder P that is not completely dispersed and mixed may be contained from the slurry F in a state in which the powder P is almost completely dispersed and mixed. The undispersed slurry Fr is sent to the circulation flow path 16. The slurry F is sent to the recovery pipe 51 of the circulation unit 50 together with bubbles contained in the slurry F. The discharge pipe 18 and the circulation flow path 16 are each connected to the lower portion of the cylindrical container 71. The recovery pipe 51 is connected to the upper portion of the cylindrical container 71.

Circulation Unit 50

As illustrated in FIGS. 1 and 2, the circulation unit 50 includes the recovery pipe 51, the intake pipe 52, a pump 53, a gas resupply pipe 54, a temperature sensor 55, a valve 56, the discharge pipe 18, and the cylindrical container 71. Here, in the following description, the discharge pipe 18 and the recovery pipe 51 for recovering the slurry F and a surplus of the reaction gas from the mixing chamber 81 to the storage tank 31 are collectively referred to as a first pipe. In addition, the intake pipe 52 and the gas resupply pipe 54 for resupplying the surplus of the reaction gas from the storage tank 31 to the mixing chamber 81 are collectively referred to as a second pipe. Furthermore, in the second pipe, the intake pipe 52 is also referred to as a first part, and the gas resupply pipe 54 is also referred to as a second part.

The recovery pipe 51 connects the cylindrical container 71 to the storage tank 31. One end of the recovery pipe 51 is connected to the upper portion of the cylindrical container 71. The other end of the recovery pipe 51 is connected to the recovery port 312 of the storage tank 31.

The temperature sensor 55 is disposed in the recovery pipe 51. The temperature sensor 55 outputs a signal corresponding to the temperature of the slurry F flowing through the inside of the recovery pipe 51 to the control unit.

The intake pipe 52 connects the storage tank 31 to the pump 53. One end of the intake pipe 52 is connected to the gas port 313 of the storage tank 31. The other end of the intake pipe 52 is connected to a suction port 531 of the pump 53.

The pump 53 suctions the reaction gas G from the mixing chamber 81 via the discharge unit 12, the discharge pipe 18, the cylindrical container 71, the recovery pipe 51, the storage tank 31, and the intake pipe 52.

In addition, the pump 53 sends the suctioned reaction gas G to the mixing chamber 81 via the gas resupply pipe 54, (specifically, via the gas resupply pipe 54, the gas supply pipe 42 between a connection position P3 and the connection position P2, the slurry resupply pipe 32 between the connection position P2 and the connection position P1, and the first supply unit 11). The connection position P3 is a position in the gas supply pipe 42 between the valve 43 and the connection position P2.

In the present embodiment, the pump 53 is a vacuum pump. Since the configuration of the vacuum pump is known, detailed descriptions thereof will be omitted here. A vacuum pump has a strong force of pulling a gas and is thus suitable as a pump used in the present embodiment. The pump 53 is not limited to the vacuum pump, and for example, other known pumps such as a diaphragm pump may be adopted.

The pump 53 includes the suction port 531 and a discharge port 532. The intake pipe 52 is connected to the suction port 531 as described above. The gas resupply pipe 54 is connected to the discharge port 532.

The gas resupply pipe 54 connects the pump 53 to the gas supply pipe 42. One end of the gas resupply pipe 54 is connected to the discharge port 532 of the pump 53 as described above. The other end of the gas resupply pipe 54 is connected to the gas supply pipe 42 at the connection position P3.

The valve 56 is disposed in the gas resupply pipe 54. The valve 56 is an example of a pipeline on-off valve. The valve 56 opens and closes the gas resupply pipe 54. In a state where the valve 56 is open, the pump 53 and the mixing chamber 81 communicate with each other via the gas resupply pipe 54, the gas supply pipe 42 between the connection position P3 and the connection position P2, the slurry resupply pipe 32 between the connection position P2 and the connection position P1, and the first supply unit 11. At this time, the reaction gas G suctioned by the pump 53 can move to the mixing chamber 81. In a state where the valve 56 is closed, the communication between the pump 53 and the mixing chamber 81 is blocked by the valve 56. At this time, the reaction gas G suctioned by the pump 53 cannot move to the mixing chamber 81.

In the present embodiment, the valve 56 is provided in the gas resupply pipe 54, but the valve 56 may be provided in at least one of the intake pipe 52 and the gas resupply pipe 54. The valve 56 may not be provided.

Method for Manufacturing Slurry by Slurry Manufacturing Apparatus 100

Hereinafter, a method for manufacturing a slurry by the slurry manufacturing apparatus 100 will be described with reference to FIGS. 1 and 3. In addition, other figures are referenced as appropriate.

In the following description, a method for manufacturing a slurry for a positive electrode of a non-aqueous electrolyte secondary battery using an aqueous solvent containing an alkali metal composite oxide will be described.

First, in a state where the valve 23 is closed and the suction of the powder P via the powder supply pipe 22 is stopped, the mixing rotor 5 is driven to rotate while the pump 34 is operated, and the operation of the dispersion mixing pump 80 is started.

By operating the pump 34, the solvent R is supplied from the storage tank 31 to the mixing chamber 81. That is, at this time, only the solvent R is supplied to the mixing chamber 81 via the first supply unit 11.

When the mixing rotor 5 is driven to rotate, the stirring blades 25 (see FIG. 6C) and the rotor blades 6 rotate integrally with the mixing rotor 5.

As the rotor blades 6 rotate, the solvent R in the mixing chamber 81 is discharged from the discharge unit 12. The discharged solvent R is supplied to the recirculation mechanism unit 70 via the discharge pipe 18, and flows from the recirculation mechanism unit 70 to the second supply unit 17 through the circulation flow path 16. Then, the solvent R is introduced into the mixing chamber 81 via the throttle portion 171 of the second supply unit 17. Here, the flow path area of the throttle portion 171 is smaller than the flow path area of the discharge unit 12. Therefore, the mixing chamber 81 is depressurized and enter a negative pressure state.

Those that depressurize the mixing chamber 81, that is, the mixing rotor 5, the discharge unit 12, the throttle portion 171, and the rotor blades 6 are examples of a depressurization unit.

When the mixing chamber 81 is in a negative pressure state, the valve 23 is opened. Accordingly, the powder P stored in the hopper 21 is supplied from the lower opening portion 212 of the hopper 21 to the mixing chamber 81 by the negative pressure suction force of the mixing chamber 81. The powder P and the solvent R are premixed in the first supply unit 11, and a preliminary mixture Fp thereof is introduced into the annular groove 10.

A step of supplying the solvent R and the powder P to the mixing chamber 81 described above is an example of a material supply step.

When the mixing rotor 5 is driven to rotate, the partition plate 15 rotates integrally with the mixing rotor 5, and the scraping blades 9 revolve. At this time, the tip part 93 of the scraping blade 9 is in a state of being fitted into the annular groove 10. Accordingly, the preliminary mixture Fp introduced into the annular groove 10 is scraped out by the tip part 93 of the scraping blade 9. The scraped preliminary mixture Fp flows in the first introduction chamber 13 in the rotation direction of the mixing rotor 5, passes through the through-holes 701, and flows into the blade chamber 8.

The preliminary mixture Fp introduced into the annular groove 10 undergoes a shearing action when scraped by the scraping blade 9. Here, since the mixing chamber 81 is in a negative pressure state, there is a pressure difference between the inside and the outside of the mixing chamber 81. Therefore, at this time, cavitation (local boiling) occurs in the preliminary mixture Fp located in the space behind the rear surface 61 (see FIG. 5) of the rotor blade 6.

That is, in the first introduction chamber 13, a shearing force can be applied to the preliminary mixture Fp and cavitation (local boiling) can be generated. Therefore, the scraped preliminary mixture Fp undergoes the shearing action from the scraping blades 9 and the through-holes 701 and is mixed, and better dispersion of the powder P in the solvent R is achieved the cavitation (local boiling). Therefore, such a preliminary mixture Fp can be supplied to the blade chamber 8, so that good dispersion of the powder P in the solvent R can be expected in the blade chamber 8. Accordingly, the powder P and the solvent R are mixed to produce the slurry F.

Although cavitation was generated in the present embodiment, cavitation may not necessarily be generated as long as the powder P is preferably dispersed.

The preliminary mixture Fp that has flowed into the blade chamber 8 flows in the rotation direction of the mixing rotor 5 and is discharged as the slurry F from the discharge unit 12. The slurry F discharged from the discharge unit 12 is supplied to the recirculation mechanism unit 70 through the discharge pipe 18, and in the recirculation mechanism unit 70, the undispersed slurry Fr is separated from the slurry F and bubbles of the solvent R are separated. The undispersed slurry Fr is supplied to the second supply unit 17 again via the circulation flow path 16, and the slurry F and bubbles move to the storage tank 31 through the recovery pipe 51.

The undispersed slurry Fr is introduced into the second introduction chamber 14 via the throttle portion 171 of the second supply unit 17 in a state where the flow rate thereof is limited. In the second introduction chamber 14, the undispersed slurry Fr is subjected to the shearing action by the plurality of rotating stirring blades 25 (see FIG. 6C) and is further finely crushed. Furthermore, the undispersed slurry Fr is also subjected to the shearing action and is crushed when passing through the through-holes 702. The undispersed slurry Fr is introduced into the blade chamber 8 via the through-holes 702 in a state where the flow rate thereof is limited. Then, in the blade chamber 8, the slurry F, which is crushed by being subjected to the shearing action by the rotor blades 6 rotating at a high speed and the cavitation and is thus further reduced in the amount of agglomerates (lumps) of the powder P is mixed with the slurry F from the first introduction chamber 13 and is discharged from the discharge unit 12.

When the supply of a predetermined amount of powder P from the hopper 21 is ended, the valve 23 is closed and the supply of the powder P to the mixing chamber 81 is stopped.

In this state, the operation of the dispersion mixing pump 80 is continued for a predetermined period of time. At this time, the slurry F replaced with the solvent R is supplied from the storage tank 31 to the mixing chamber 81.

When the powder P is not supplied, air is not suctioned from the first supply unit 11, so that the degree of vacuum in the mixing chamber 81 is increased. By rotating the rotor blades 6 in this state, at least the region in the blade chamber 8 can be made into a fine bubble region in which a large number of fine bubbles (microbubbles) of the solvent R are generated. Accordingly, the solvent R that has permeated the agglomerates (so-called lumps) of the powder P foams over the entire circumference in the blade chamber 8 to promote the crushing of the agglomerates, and furthermore, the dispersion of the powder P is further promoted by an impact force when the generated fine bubbles are pressurized and disappear in the blade chamber 8 or when the diameter of the bubbles becomes smaller. As a result, in almost the entire slurry F present in the entire circumference of the blade chamber 8, it is possible to more reliably produce a high-quality slurry F in which the powder P is well dispersed in the solvent R.

A step of mix the solvent R and the powder P by driving the mixing rotor 5 described above is an example of a mixing step.

While continuing the operation of the dispersion mixing pump 80, a supply step of supplying the reaction gas G to the slurry F produced in the mixing step is performed.

In the supply step, the valve 43 is opened after the operation of the dispersion mixing pump 80 is continued for a predetermined period of time. Accordingly, the reaction gas G stored in the cylinder 41 is supplied to the mixing chamber 81 by the negative pressure suction force of the mixing chamber 81.

In the present embodiment, a timing at which the reaction gas G is supplied to the mixing chamber 81 is after the operation of the dispersion mixing pump 80 is continued for a predetermined period of time, that is, after the mixing step, but is not limited to this timing. For example, the timing at which the reaction gas G is supplied to the mixing chamber 81 may be a timing before the material supply step, or a timing after the material supply step and before the mixing step. In this case, by acidifying the water component of the solvent R in advance, it is possible to suppress rapid alkalization due to contact between lithium hydroxide contained in the slurry and water. Therefore, it is possible to suppress the production of a strongly alkaline slurry having a pH value of more than 11, and thus it is possible to suppress the corrosion of the aluminum current collector during coating.

By supplying the reaction gas G to the mixing chamber 81, the reaction gas G is supplied to the slurry F flowing through the mixing chamber 81. Accordingly, the reaction gas G is dissolved in the slurry F. As a result, the alkaline component in the slurry F is neutralized.

Here, as described above, cavitation (local boiling) occurs in the slurry F located in the space behind the rear surface 61 of the rotor blade 6. In the space, the slurry F is subjected to a neutralization treatment while generating cavitation (local boiling). Due to cavitation (local boiling), the bubbles of the reaction gas G repeatedly expand and contract, and the contact area with the solvent R or the slurry F increases, so that neutralization can proceed rapidly. Accordingly, it is possible to neutralize the alkaline component in the slurry F within a shorter period of time.

Through the supply step, in addition to the good dispersion of the powder P in the solvent R, it is possible to produce a higher quality slurry F in which the alkaline component is neutralized.

While the supply step is being performed, a circulation step described in detail below is performed.

In the circulation step, the pump 53 is driven. Accordingly, the surplus of the reaction gas G supplied to the mixing chamber 81 is suctioned and recovered by the pump 53 via the discharge pipe 18, the recirculation mechanism unit 70, the recovery pipe 51, the storage tank 31, and the intake pipe 52.

Here, the surplus of the reaction gas G is, in the reaction gas G supplied to the mixing chamber 81 in the supply step, one that has not been dissolved in the slurry F and one that has been dissolved in the slurry F but has been subsequently degassed from the slurry F. The reaction gas G is degassed from the slurry F by operating the dispersion mixing pump 80 to cause cavitation (local boiling) in the slurry F in the mixing chamber 81.

In addition, by driving the pump 53, the suctioned reaction gas G is resupplied to the mixing chamber 81 via the gas resupply pipe 54, the gas supply pipe 42 between the connection position P3 and the connection position P2, the slurry resupply pipe 32 between the connection position P2 and the connection position P1, and the first supply unit 11.

By opening and closing the valve 56, it is possible to switch whether or not the reaction gas G is resupplied to the mixing chamber 81. Accordingly, it is possible to prevent an excessive resupply of the reaction gas G.

At least a portion of the reaction gas G resupplied to the mixing chamber 81 is dissolved in the slurry F and neutralizes the alkaline component in the slurry F.

In the present embodiment, the circulation step is executed while the supply step is being performed. That is, while the supply of the reaction gas G from the cylinder 41 to the mixing chamber 81 is performed, the surplus of the reaction gas G is resupplied to the mixing chamber 81 by the pump 53. However, the circulation step may be performed after the supply step is performed. That is, when a predetermined amount of the reaction gas G is supplied from the cylinder 41 to the mixing chamber 81, the valve 43 is closed to stop the supply, and thereafter the resupply of the surplus of the reaction gas G to the mixing chamber 81 by the pump 53 may be resumed. Furthermore, in a case where the circulation step is performed while the supply step is being performed, the circulation step may be continuously performed even if only the supply step is ended first.

The surplus of the reaction gas G supplied to the mixing chamber 81 by the gas supply unit 40 is recovered by the circulation unit 50 and resupplied to the mixing chamber 81. Accordingly, at least a portion of the reaction gas G to be supplied to the mixing chamber 81 by the gas supply unit 40 can be replaced by the reaction gas G resupplied from the circulation unit 50. As a result, the amount of the reaction gas G supplied to the mixing chamber 81 by the gas supply unit 40 can be reduced. Accordingly, the amount of the reaction gas G emitted to the outside can be reduced, so that the environmental load can be reduced.

The produced high-quality slurry F is supplied to subsequent steps via the discharge pipe 84 of the slurry F.

Modification Example

In the above embodiment, an example in which cavitation (local boiling) is generated to mix the powder P and the solvent R has been described. However, the powder P and the solvent R may be mixed only by stirring by rotating the mixing rotor 5 without generating cavitation (local boiling).

In the above embodiment, an example of mixing the powder P and the solvent R in a state where the mixing chamber 81 is depressurized has been described. However, the powder P and the solvent R may be mixed without depressurizing the mixing chamber 81 (for example, while maintaining the mixing chamber 81 at atmospheric pressure).

In the above embodiment, the reaction gas G is supplied to the first introduction chamber 13 of the mixing chamber 81, but may also be supplied to other than the first introduction chamber 13 of the mixing chamber 81 (the second introduction chamber 14 or the blade chamber 8).

Filters for preventing the powder P from erroneously reaching the pump 53 may be provided in the intake pipe 52, the gas port 313, the suction port 531, and the like. The filter is, for example, a semipermeable membrane that restricts the passage of liquids and solids and allows the passage of gases.

Figure 7:
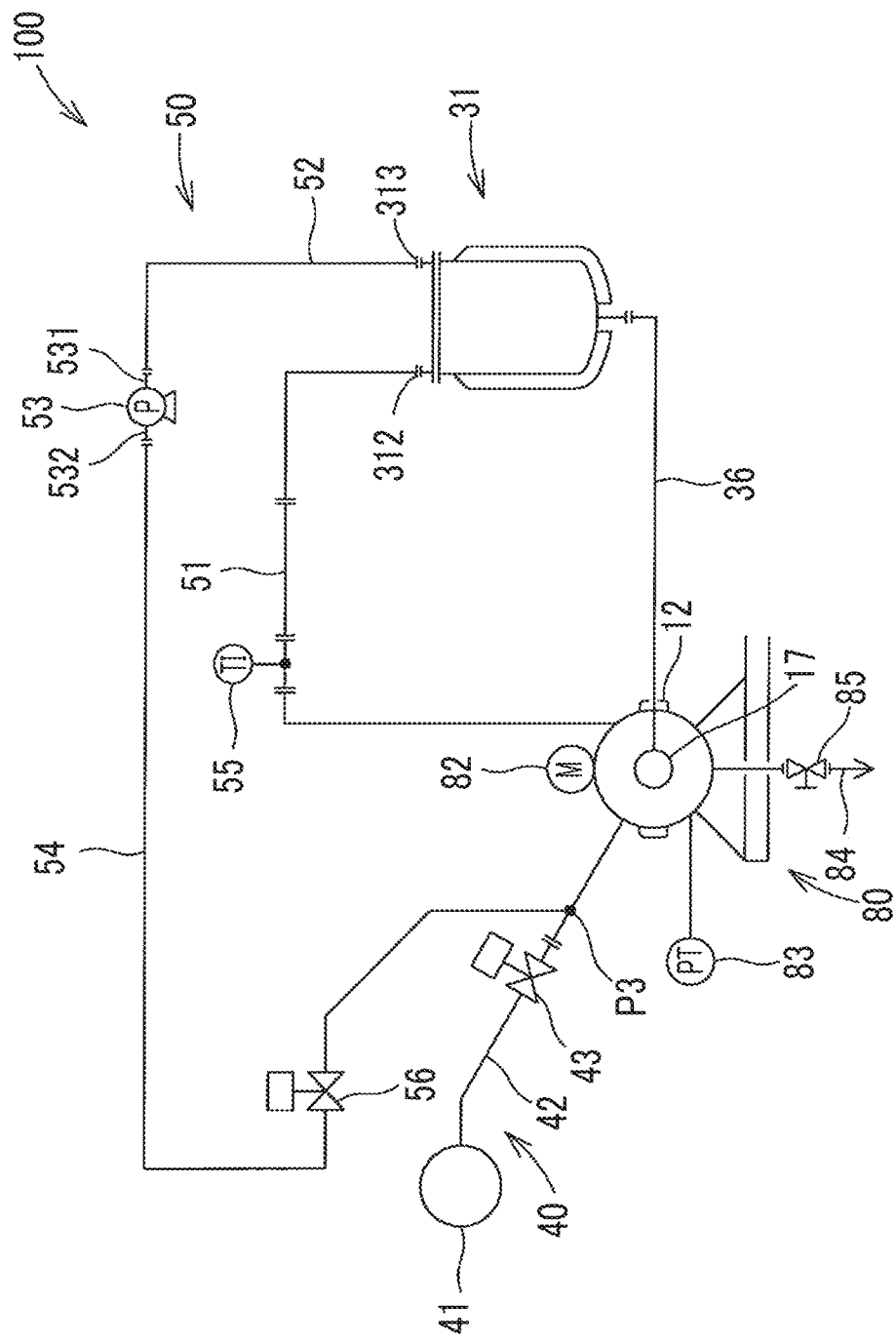
FIG. 7 is an explanatory view illustrating an outline of the slurry manufacturing apparatus in a modification example.

In the above embodiment, the slurry manufacturing apparatus 100 has a configuration as illustrated in FIG. 1. The slurry manufacturing apparatus 100 illustrated in FIG. 1 is for external circulation, and the solvent R and the slurry F stored in the storage tank 31 are supplied to the first supply unit 11 of the dispersion mixing pump 80 via the slurry resupply pipe 32. However, the slurry manufacturing apparatus 100 is not limited to the configuration illustrated in FIG. 1. For example, the slurry manufacturing apparatus 100 may be for internal circulation as illustrated in FIG. 7. In the slurry manufacturing apparatus 100 illustrated in FIG. 7, the solvent R and the slurry F stored in the storage tank 31 are supplied to the second supply unit 17 of the dispersion mixing pump 80 via a supply pipe 36.

In the above embodiment, the slurry F is a slurry for a positive electrode of a non-aqueous electrolyte secondary battery using an aqueous solvent containing an alkali metal composite oxide. The powder P is a predetermined slurry material used for manufacturing an electrode for a non-aqueous electrolyte secondary battery, the solvent R is water, and the reaction gas G is carbon dioxide gas. However, the slurry F may be produced by mixing a solid and a liquid, and is not limited to the above-mentioned slurry for a positive electrode. In addition, the powder P (solid), the solvent R (liquid), and the reaction gas G (gas) are not limited to the above-mentioned substances.

Second Embodiment

Figure 8:
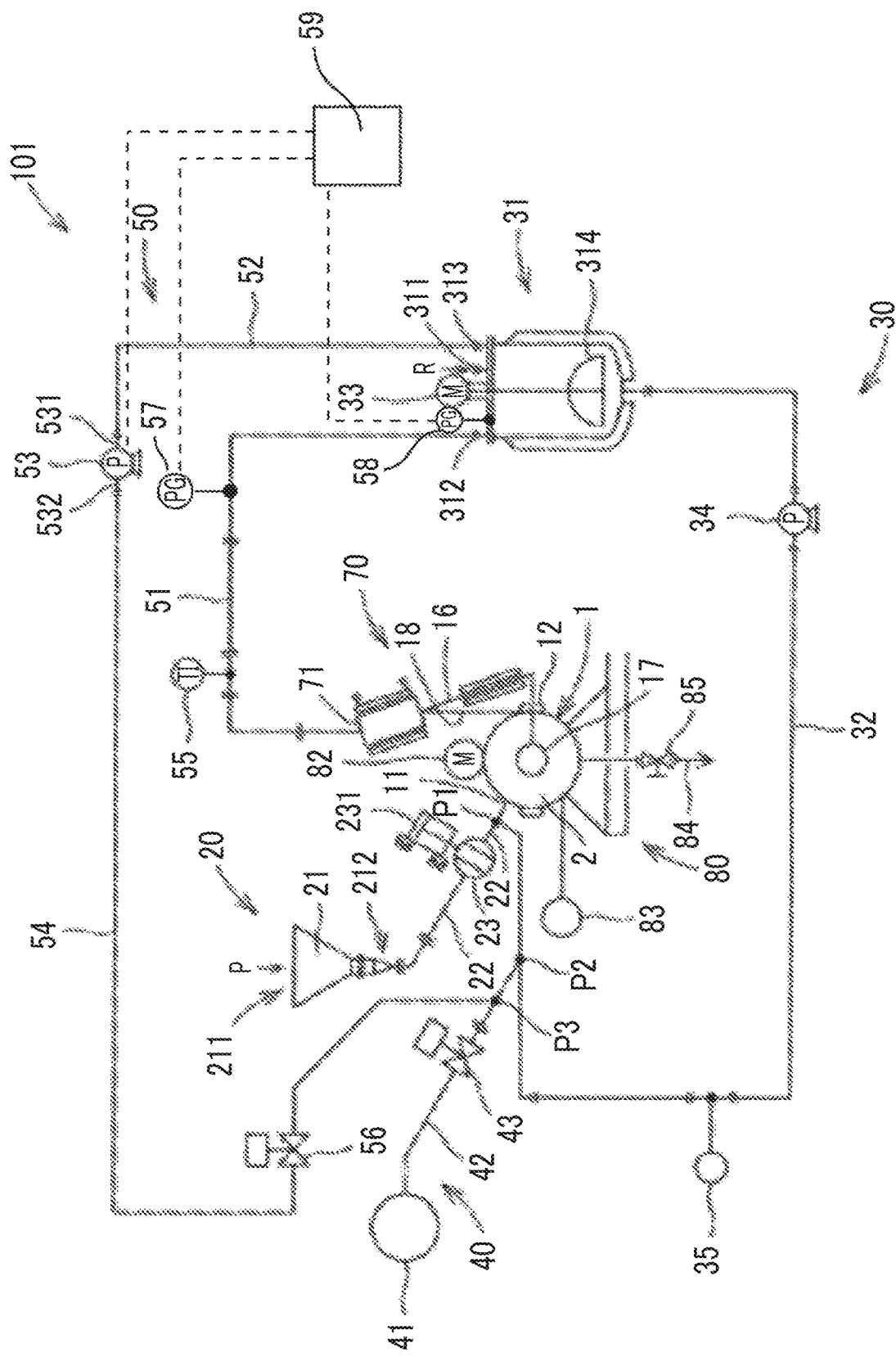
FIG. 8 is an explanatory view illustrating an outline of a slurry manufacturing apparatus according to a second embodiment.

FIG. 8 illustrates a slurry manufacturing apparatus 101 according to a second embodiment of the present invention. The second embodiment illustrated in FIG. 8 is characterized in that in addition to the configuration of the first embodiment, a first pressure gauge 57, a second pressure gauge 58, and a control unit 59 are provided, and the control unit 59 controls the pump 53 based on the values of the first pressure gauge 57 and the second pressure gauge 58. The description of the same configuration as that of the first embodiment will be omitted.

The first pressure gauge 57 is provided in the recovery pipe 51 and measures the pressure in the recovery pipe 51. The second pressure gauge 58 is provided in the storage tank 31 and measures the pressure in the storage tank 31. The kind, material, and the like of the first pressure gauge 57 and the second pressure gauge 58 are not limited as long as the pressure can be measured.

In the supply step of the first embodiment, the reaction gas G is supplied from the gas supply unit 40 to the slurry F, but the reaction gas G that has not been dissolved in the slurry F is collected in the storage tank 31 during the introduction or suspension of the introduction of the reaction gas G, whereby the pressure in the storage tank 31 increases. When the pressure in the storage tank 31 becomes higher than the pressure in the recovery pipe 51, there may be cases where the slurry does not flow through the recovery pipe 51.

Therefore, in the slurry manufacturing apparatus 101 according to the second embodiment, the pressure in the recovery pipe 51 and the pressure in the storage tank 31 are respectively measured by using the first pressure gauge 57 and the second pressure gauge 58, so that a state where the slurry F flows can be measured. In a case where the pressure in the storage tank 31 becomes higher than the pressure in the recovery pipe 51, an unreacted gas in the storage tank 31 is circulated through the gas resupply pipe 54 to the mixing chamber 81 by driving the pump 53. Accordingly, the pressure in the storage tank 31 is reduced, and the slurry can flow through the recovery pipe 51.

The first pressure gauge 57 may measure the pressure in front of the storage tank 31, and may be installed, for example, in the cylindrical container 71. The second pressure gauge 58 may measure the pressure after the storage tank 31, and may be installed, for example, in the intake pipe 52.

The control unit 59 is electrically connected to the first pressure gauge 57, the second pressure gauge 58, and the pump 53 to control the pump 53 based on the measurement results of the first pressure gauge 57 and the second pressure gauge 58, and may be, for example, a computer. The control unit 59 is not limited to a computer and may perform control by another method. For example, manual control by an observer or the like can be considered.

By performing control by the control unit 59, the pressures in the recovery pipe 51 and the storage tank 31 can be controlled more accurately and quickly, and the slurry can be efficiently flowed to the recovery pipe 51.

Third Embodiment

Figure 9:
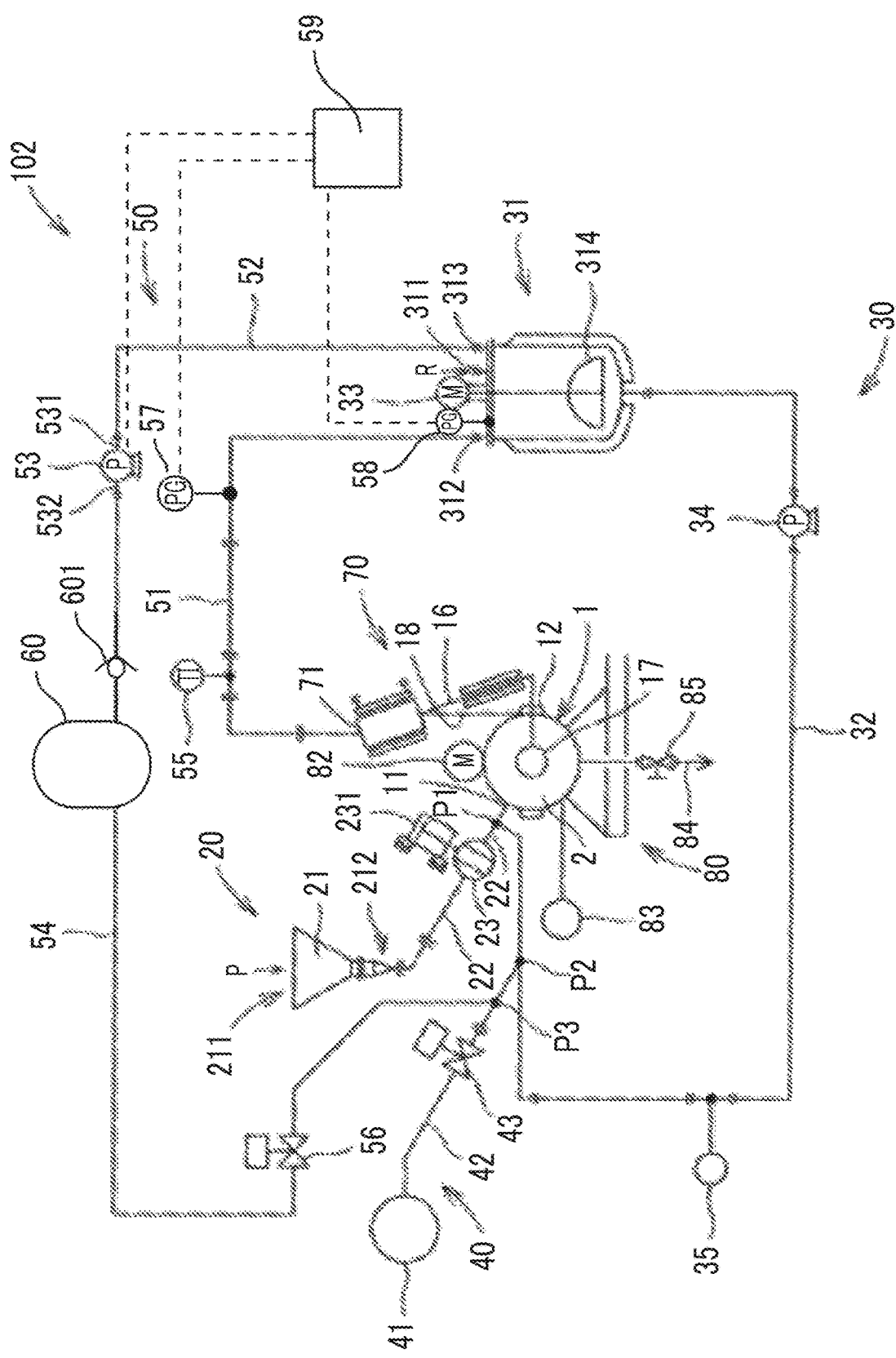
FIG. 9 is an explanatory view illustrating an outline of a slurry manufacturing apparatus according to a third embodiment.

FIG. 9 illustrates a slurry manufacturing apparatus 102 according to a third embodiment of the present invention. The third embodiment illustrated in FIG. 9 is characterized in that, in addition to the configuration of the second embodiment, a gas recovery tank 60 and a check valve 601 are provided. The description of the same configuration as that of the second embodiment will be omitted.

The gas recovery tank 60 recovers the surplus of the reaction gas G in the recovery pipe 51, and is installed in the gas resupply pipe 54. In addition, the gas recovery tank 60 may be installed anywhere as long as the surplus of the reaction gas G in the recovery pipe 51 can be recovered, and may be installed, for example, in the recovery pipe 51 or the intake pipe 52. The kind, material, size, and the like of the gas recovery tank 60 are not limited as long as the gas recovery tank 60 has a valve capable of recovering a gas and allowing the gas to pass therethrough as appropriate.

The check valve 601 is backflow preventing means for preventing the unreacted gas recovered in the gas recovery tank 60 from flowing back into the storage tank 31, and the kind, material, and the like thereof are not limited as long as the backflow of the unreacted gas recovered in the gas recovery tank 60 can be prevented. Specific examples of the check valve include a ball type check valve and a noval type check valve.

In addition, the check valve 601 may be installed anywhere as long as the unreacted gas recovered in the gas recovery tank 60 can be prevented from flowing back to the storage tank 53, and may be installed, for example, at a connection portion between the gas recovery tank 60 and the gas resupply pipe 54, or on the storage tank 31 side of the gas resupply pipe 54.

The backflow preventing means may be other than the check valve. For example, the backflow preventing means may be means for preventing backflow by continuously driving the pump 53, or means for preventing backflow by closing a valve and stopping the outflow of the unreacted gas stored in the gas recovery tank 60.

In the slurry manufacturing apparatus 102 according to the third embodiment, when the pump 53 is driven and the pressure in the storage tank 31 is reduced, the unreacted gas discharged from the storage tank 31 can be recovered in the gas recovery tank 60. The unreacted gas recovered in the gas recovery tank 60 is supplied to the dispersion mixing pump 80 as needed by opening and closing the valve 56 installed on the downstream side. Furthermore, since a negative pressure state is established between the connection position P2 and the connection position P1 of the slurry resupply pipe 32 by driving the dispersion mixing pump 80, when the valve 56 is opened, the unreacted gas is naturally supplied from the gas recovery tank 60 to the dispersion mixing pump 80.

Accordingly, in the slurry manufacturing apparatus 102 according to the third embodiment, the unreacted gas recovered in the gas recovery tank 60 can be used again for the manufacturing the slurry. Therefore, in addition to the effect of reducing the amount of the reaction gas G emitted from the slurry manufacturing apparatus, an effect of reducing the supply amount of the reaction gas G supplied from the gas supply unit 40 into the slurry manufacturing apparatus can be exhibited. It should be understood that the invention is not limited to the above-described embodiment, but may be modified into various forms on the basis of the spirit of the invention. Additionally, the modifications are included in the scope of the invention.

What is claimed is:

1. A slurry manufacturing apparatus comprising:
   a mixing unit that mixes a predetermined powder and a solvent in a mixing chamber to produce a slurry;
   a supply unit that supplies a reaction gas to the mixing chamber when the slurry is produced by the mixing unit;
   a circulation unit that recovers a surplus of the reaction gas from the mixing chamber and resupplies the surplus of the reaction gas to the mixing chamber; and
   a storage unit that recovers the slurry produced in the mixing chamber and stores the slurry,
   wherein the circulation unit has a first pipe that connects the mixing chamber to the storage unit, and recovers the slurry and the surplus of the reaction gas from the mixing chamber to the storage unit, and a second pipe that connects the storage unit to the mixing chamber, and supplies the surplus of the reaction gas from the storage unit to the mixing chamber.

2. The slurry manufacturing apparatus according to claim 1, further comprising:
   a powder supply unit that supplies the powder to the mixing chamber.

3. The slurry manufacturing apparatus according to claim 2,
   wherein the powder supply unit includes a hopper, a powder supply pipe, and a valve that opens and closes the powder supply pipe.

4. The slurry manufacturing apparatus according to claim 3,
   wherein the hopper is formed in an inverted conical shape, and discharges the powder received from an upper opening portion from a lower opening portion,
   the powder supply pipe is a cylindrical pipe disposed in a state in which a center axis is inclined with respect to a vertical direction, and
   the valve opens and closes the powder supply pipe by a shutter moved by an air cylinder.

5. The slurry manufacturing apparatus according to claim 1,
   wherein the mixing unit includes a casing, a first supply unit, a discharge unit, a second supply unit, a mixing rotor, a pump drive motor, a partition plate, a stator, a pressure sensor, and
   a discharge pipe.

6. The slurry manufacturing apparatus according to claim 5,
   wherein the casing includes a cylindrical outer peripheral wall portion having openings at both ends closed by a front wall portion and a rear wall portion,
   the first supply unit is provided at a position shifted to an outer peripheral side of a center axis of the front wall portion,
   the discharge unit discharges the slurry produced by mixing the powder and the solvent in the mixing chamber, and
   the second supply unit protrudes from a center portion of the front wall portion, and one end of the second supply unit is connected to the front wall portion.

7. The slurry manufacturing apparatus according to claim 6,
   wherein the mixing rotor is rotatably provided inside the casing, and is configured to have a shape in which a front surface bulges substantially into a truncated cone shape,
   the partition plate is configured in a substantially funnel shape having an outer diameter slightly smaller than an inner diameter of the stator, and includes a funnel-shaped portion protruding in a cylindrical shape at a center portion thereof, and
   the stator is disposed between the front wall portion and the mixing rotor.

8. The slurry manufacturing apparatus according to claim 7,
   wherein a tubular sliding contact portion at a top of the funnel-shaped portion is open, and
   an annular flat plate portion is provided at an outer peripheral portion of the funnel-shaped portion with both a front surface and a rear surface being in a state perpendicular to an axial center of the casing.

9. The slurry manufacturing apparatus according to claim 1, wherein the supply unit includes a cylinder that stores reaction gas, a gas supply pipe, and a valve that opens and closes the gas supply pipe.

10. The slurry manufacturing apparatus according to claim 9,
wherein the gas supply pipe is a cylindrical pipe, and one end of the gas supply pipe is connected to an upper end portion of the cylinder.

11. The slurry manufacturing apparatus according to claim 1, further comprising:
a depressurization unit that depressurizes the mixing chamber.

12. The slurry manufacturing apparatus according to claim 1, further comprising:
a pump having a suction port and a discharge port, wherein the second pipe includes
a first part that connects the suction port to the storage unit, and
a second part that connects the discharge port to the mixing chamber.

13. The slurry manufacturing apparatus according to claim 1,
wherein the mixing unit rotates a mixing rotor in the mixing chamber to produce the slurry, and
the first pipe is connected to the mixing chamber such that the slurry is introduced into the first pipe along a flow of the slurry formed by the rotation of the mixing rotor.

14. The slurry manufacturing apparatus according to claim 1,
wherein the first pipe extends from an upper portion side of the mixing chamber.

15. The slurry manufacturing apparatus according to claim 1,
wherein the first pipe and the storage unit are provided with a first pressure gauge and a second pressure gauge, respectively, and
a pump provided in the second pipe is controlled based on values of the first pressure gauge and the second pressure gauge.

16. A method for manufacturing a slurry, comprising:
a mixing step of mixing a predetermined powder and a solvent in a mixing chamber to produce a slurry, by a mixing unit;
a supply step of supplying a reaction gas to the mixing chamber when the slurry is produced in the mixing step, by a supply unit;
a circulation step of recovering a surplus of the reaction gas from the mixing chamber and resupplying the surplus of the reaction gas to the mixing chamber, by a circulation unit; and
a storing step of recovering the slurry produced in the mixing chamber and storing the slurry, by a storage unit,
wherein the circulation unit has a first pipe that connects the mixing chamber to the storage unit, and recovers the slurry and the surplus of the reaction gas from the mixing chamber to the storage unit, and a second pipe that connects the storage unit to the mixing chamber, and supplies the surplus of the reaction gas from the storage unit to the mixing chamber.

* * * * *